Jan 6, 1931. H. J. HEIDER 1,787,822
METHOD OF ASSEMBLING WHEELS
Filed Jan. 25, 1929

Inventor.
Henry J. Heider.
by Orwig & Hague Attorneys.

Patented Jan. 6, 1931

1,787,822

UNITED STATES PATENT OFFICE

HENRY J. HEIDER, OF CARROLL, IOWA

METHOD OF ASSEMBLING WHEELS

Application filed January 25, 1929. Serial No. 335,082.

The object of my invention is to provide a wheel especially designed for use in toy wagons, and of simple, durable and inexpensive construction and of attractive appearance.

A further object of my invention is to provide an improved method of assembling a wheel of this character and by which the assembling may be completed in a convenient, facile and economical manner, and when finished the hub assembly will be firmly held together and a uniform tension will be applied to all of the spokes without independent adjusting or tightening thereof.

My invention consists in the construction, arrangement and combination of the various parts of the wheel, and in the method of assembling the wheel members, whereby the objects contemplated are attained, as hereinafter more fully set forth, pointed out in my claims, and illustrated in the accompanying drawings, in which:

Figure 1:
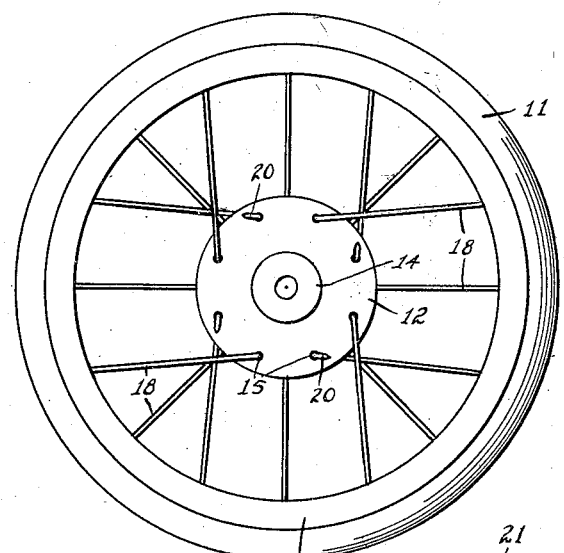
Figure 1 shows a side elevation of a wheel embodying my invention.

Referring to the accompanying drawings, I have used the reference numeral 10 to indicate the wheel rim, which is of the ordinary construction and designed to receive a rubber tire 11. It is provided with spoke openings at its inner central portion.

Figure 4:
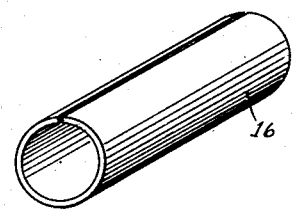
Figure 4 shows an isometric view of the hub sleeve.

The hub assembly comprises two hub flanges 12, each of which has a cup shaped central portion 13 with parallel sides open at its inner side and partially closed at 14 at its outer side. It is also provided with spoke openings 15. The hub sleeve is preferably made from a sheet of spring metal rolled to cylindrical position and indicated by the numeral 16. Its adjacent edges are normally slightly spaced apart as shown in Figure 4.

Within the sleeve I provide a roller bearing assembly 17 of the ordinary construction, and the spokes are indicated by the numeral 18, and have at one end a head 19 and at the other end they are bent at right angles at 20. These spokes may be made of steel wire, and I have obtained very satisfactory results by the use of steel wire nails, which before being assembled have the ends 20 bent at right angles.

Figure 2:
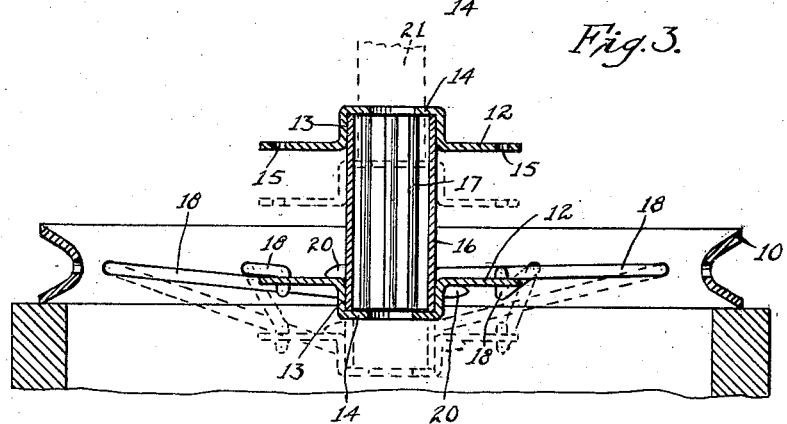
Figure 2 shows a vertical, central, sectional view of a part of my improved wheel showing the position of the hub assembly when the first set of spokes is applied thereto, and by dotted lines showing the position to which this hub assembly is forced before applying the second set of spokes.

My improved method of assembling the wheel is as follows:

I first take the inner hub flange, shown in Figure 1, and shown at the bottom in Figure 2, and extend the spokes through the openings in the rim. Each adjacent pair of spokes is then crossed, as shown in Figure 1, and the end 20 of one pair is extended through the opening in the hub flange from the outer side, and the other one of the pair is extended through the flange on the inner side of the wheel, as shown in Figure 1.

The length of the spokes between the head and the part 20 is such that they can be thus inserted only when the flange is substantially at the center line of the rim, as shown by solid lines in Figure 2. Then the ends 20 are bent down flat against the flange. I then place the hub sleeve 16 in position within the cup shaped member of the flange, and when this is being done the edges of the hub member are forced together, and when released they are yieldingly and frictionally held between the parallel sides of the hub flange cup member. Then the other hub flange member is forced upon the opposite end of the hub sleeve, as shown in Figure 2, and is also yieldingly and frictionally held.

I then apply a pressure device, as indicated by the numeral 21 in Figure 2, to the upper hub cup member and force the hub assembly downwardly to about the position shown by dotted lines in Figure 2. That is to say to a point to and beyond the normal position of the assembled wheel, thereby placing the spokes under a tension somewhat in excess of their normal tension.

Figure 3:
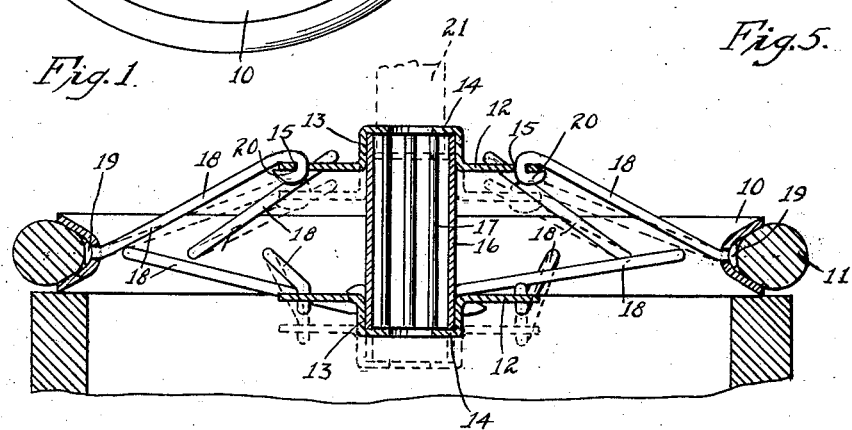
Figure 3 shows a similar view illustrating the completed wheel assembly, and by dotted line showing the position of the hub flanges and hub sleeve and spokes at the time the last set of spokes is applied in position and before the pressure is removed to permit the hub assembly to assume its final position within the rim.

I then insert the remaining spokes through the flange, and all of them are arranged exactly radially and the ends 20 are inserted in the openings in the upper flange from the top, as shown in Figure 3, downwardly. Then the ends 20 are bent radially outwardly, as shown in Figure 3, and finally the pressure device 21 is removed, thus permitting the hub assembly to move from the dotted line position, as shown in Figure 3, to the solid line position of the completed wheel assembly, and somewhat reduce the tension applied to the lower set of spokes, as shown in Figure 3, and applying an equal tension to the upper set of spokes. That is to say, when the pressure device is removed, the spokes all automatically assume the position in which they will have equal tension.

The fact that the spokes are all under tension causes the two hub flanges and their cup shaped members to yieldingly hold the hub sleeve in position by applying tension to the outer ends of the hub cups, firmly holding them to the ends of the hub sleeve.

Figure 5:
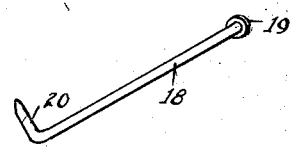
Figure 5 shows a similar view of one of the spokes ready to be assembled.

I preferably use spokes like that shown in Figure 5, all exactly alike, and the bends 20 are formed on them by accurate machinery, so that the length of the spokes from the head to the end 20 is exactly the same.

It is desirable that the outer side of the wheel shall have the hub flange project out farther than it does on the inner side of the wheel, as shown in Figure 3. However, by properly arranging the openings in the hub caps, this desirable result can be accomplished by the use of spokes of all the same size, because the spokes applied to the inner flange, as shown in Figure 2, are crossed and arranged nearly tangentially to the hub flange, whereas those on the outer hub flange are radial but are inclined relative to the center of the rim to a considerably greater extent than are the spokes on the lower hub flange, as clearly shown in Figure 3.

From the foregoing it will be obvious that with my improved construction of wheel, and by the use of my improved method the completed wheel is of extremely strong and durable construction. The spokes are all under uniform tension and the entire hub assembly is yieldingly and frictionally held together in such a way that none of the parts can be moved relative to each other under conditions of ordinary use, and this assembly may be very quickly and easily accomplished by unskilled labor, and without the use of any machine work, other than the bending over of the spoke ends during the assembling.

I claim as my invention:

1. The method of assembling a wheel, which consists in providing a hub flange having a cup shaped recess, then connecting spokes with said hub flange and with a wheel rim, then placing a hub sleeve in the said cup member, then providing another hub flange having a cup shaped member to the other end of the hub sleeve, then applying pressure to the hub assembly and pushing it laterally to and beyond its normal position within the rim, and thereby applying greater than normal tension to said spokes, then fixing spokes to the latter hub flange and rim, and finally releasing the pressure and permitting the hub assembly to be moved laterally by the tension of the spokes applied to the first mentioned hub flange to thereby equalize the tension upon all of the spokes.

2. The method of assembling a wheel which consists in supporting a rim and connecting the rim and one flange of a hub having two spaced flanges with spokes, then applying pressure to the hub and pushing it laterally to and beyond its normal position within the rim and thereby applying greater than normal tension to the spokes, then fixing spokes to the rim and the second hub flange, and finally releasing the pressure and permitting the hub to be moved laterally by the tension of the spokes connecting the first mentioned hub flange and the rim to thereby equalize the tension upon all of the spokes.

Des Moines, Iowa, January 21, 1929.

HENRY J. HEIDER.